B. BRUHN.
CEMENT AND PROCESS OF MAKING THE SAME.
APPLICATION FILED OCT. 5, 1905.
983,024.
Patented Jan. 31, 1911.
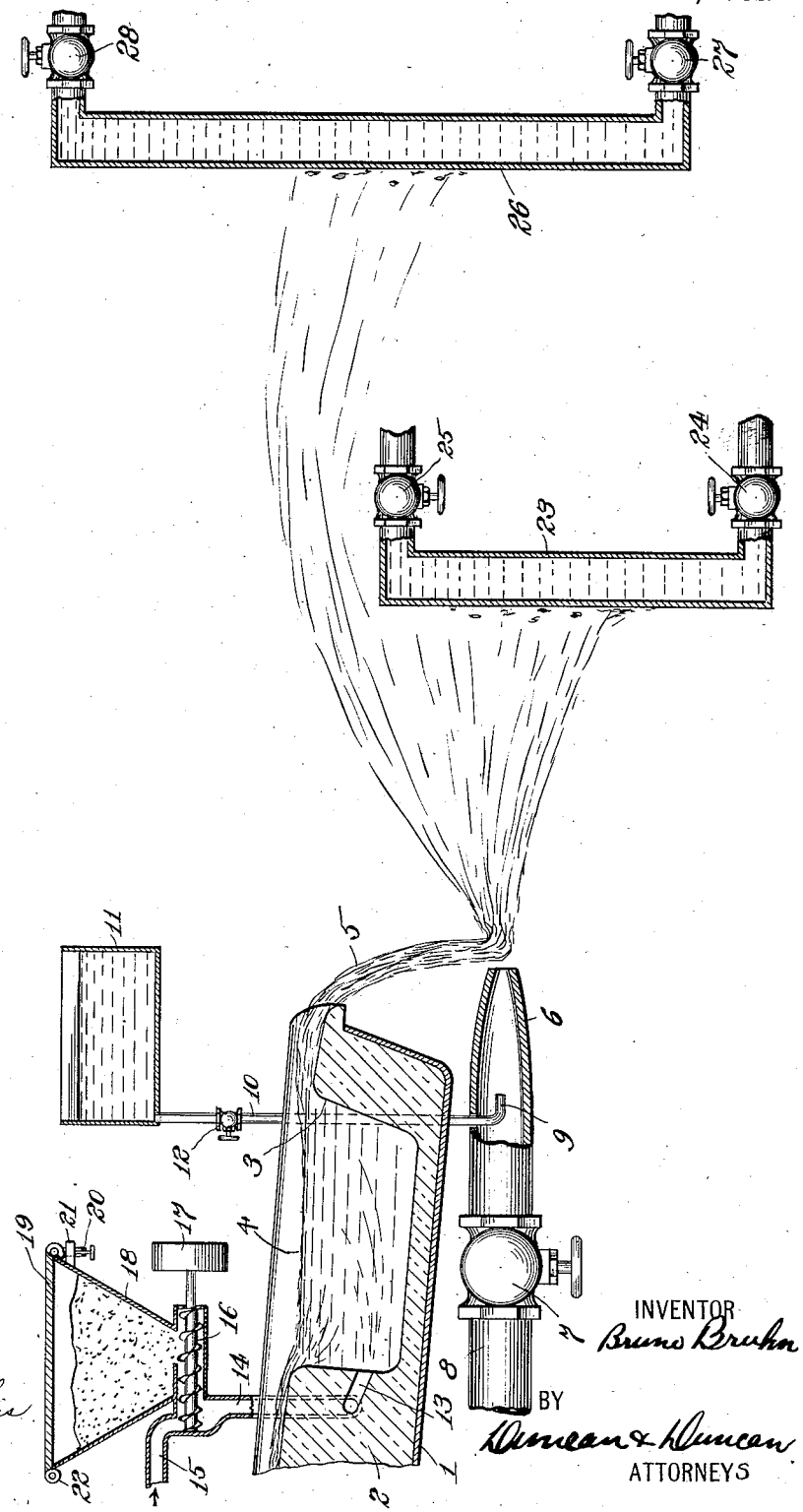
WITNESSES:
INVENTOR
Bruno Bruhn
BY
Duncan & Duncan
ATTORNEYS

UNITED STATES PATENT OFFICE.

BRUNO BRUHN, OF HAMBURG, GERMANY, ASSIGNOR, BY MESNE ASSIGNMENTS, TO THE ATLAS PORTLAND CEMENT COMPANY, OF NEW YORK, N. Y., A CORPORATION OF PENNSYLVANIA.

CEMENT AND PROCESS OF MAKING THE SAME.

983,024.     Specification of Letters Patent.     Patented Jan. 31, 1911.

Application filed October 5, 1905. Serial No. 281,382.

*To all whom it may concern:*

Be it known that I, BRUNO BRUHN, a citizen of the German Empire, residing at Hamburg, Germany, have invented certain new and useful Improvements in Cement and Processes of Making the Same, of which the following is a specification, taken in connection with the accompanying drawings.

This invention relates to cement and process of making the same and relates especially to cement made from slag and to processes for treating fluid blast furnace slag or similar molten material so as to make it when properly granulated a more efficient cementitious material.

The accompanying drawing shows in section a diagrammatic embodiment of means for carrying out this invention.

The metallic casing 1 may be filled with suitable refractory lining material 2, such as preferably a carbonized mixture of coke, clay and tar and provided with a suitable chamber 3 so as to form a cavity of considerable extent. In this way the molten furnace slag or similar material flowing down the chute forms a pool 4 in this chamber and also a whirling action takes place in this mixing pool which materially aids in mingling the slag and added ingredients. The molten slag subsequently passes over the chute in a stream 5 which may be disintegrated, granulated and cooled in the desired way so as to form cementitious material. This may be accomplished by means of a jet or blast of air, steam or similar fluid and for this purpose the nozzle 6 is mounted to coöperate with the slag stream, fluid being fed through the pipe 8 in the desired quantities as regulated by the valve 7 to this nozzle so as to form a jet of the proper intensity. If desired, liquid may be added to this jet by means of the tank 11, the liquid passing through the pipe 10 and nozzle 9 in the desired quantities, a suitable valve 12 being used to control this liquid discharge. While water alone may be used in this way, it is desirable to use an alkaline solution and a suitable solution of sodium or potassium salts gives a very desirable result. Solutions of caustic soda or sodium carbonate or in some cases of alum may be used in this way, the water assisting in the granulating action and the alkali being to a considerable extent combined with or absorbed by the slag granulated. Also, if desired, alkaline material may be added to the molten slag by introducing powdered alkaline material into the slag stream in any desired way before its disintegration. Powdered material of this kind may be placed in a hopper 18 of any desired form or construction, this hopper being indicated as provided with a cover 19 to close the top of the same, this cover being pivoted about the pin 22 and held by the clamp 20 which coöperates with the lug 21. A suitable conveyer screw 16 is indicated as being driven by the pulley 17 so as to carry this powdered alkaline material from the hopper in desired quantities so that it may be dropped down the pipe 14 and the injecting nozzle 13 so as to be injected into and mixed with the molten slag in the mixing pool and this action may be assisted by a blast of air or similar fluid passing through the pipe 15 and carrying the powdered material into the mixed mass of slag and agitating the same. Alkali salts, such as sodium or potassium carbonate or hydrate and also either the pure or crude chlorids or sulfates may be used, the amount of this alkaline material varying, of course, with the particular kind of slag used, 3% being in general sufficient for this purpose. The molten slag material after the incorporation of the desired quantity of alkali may be disintegrated by the air jet which separates this highly heated slag material into fine particles which are driven against suitable cooling surfaces, such as the cooling surface 23, which is provided with a water jacket, as indicated, the amount of cooling fluid being regulated by the valves 24, 25. This may be arranged at the proper distance, preferably several feet from the air jet so as to intercept only part of the slag particles, the rest of the particles passing a longer distance through the air and being proportionately cooler when they strike the cooling or impinging surface 26 formed in a similar way and cooled by a suitable fluid or cooling medium, the amount of which is regulated by the valves 27 28. In this way as is well known, molten blast furnace slag which may have less that the 50% of lime is converted into active and inert slag material by this regulated disintegrating and cooling process as is set forth in the Passow patent, 747,920 of December 22, 1903. Preferably the active and inert slag materials are mixed in the proper proportion and finely ground together with about 10% of regular Portland cement or other independently cementitious material, and also gypsum may be added up to a few per cent., if desired, to further regulate the setting.

The alkaline material added to the molten slag before disintegration is in some cases at least so intimately mingled therewith as to be chemically combined, probably forming silicates and other compounds. This alkaline material has a very desirable effect in making the cement set more quickly and strongly and seems to have a catalytic action in the cement during the setting so as to promote the chemical or crystallizing action taking place at that time. The hydrates or caustic alkalis seem to act more strongly in this way with most kinds of slag and the carbonates, sulfates and chlorids are progressively less strong in this respect in most cases.

Having thus described this invention in connection with an illustrative form of the same, to the details of which I do not desire to be limited, what is claimed as new and what I desire to secure by Letters Patent is set forth in the appended claims.

1. The cement process which consists in incorporating alkaline salts in molten furnace slag, in incorporating alkaline solutions with said slag, in granulating and cooling said slag to produce cementitious material and in adding Portland cement thereto.

2. The cement process which consists in incorporating alkaline salts with molten furnace slag, in disintegrating and cooling said slag to produce cementitious material therefrom and in adding Portland cement thereto.

3. The cement process which consists in incorporating sodium salts with highly heated slag material, in treating said slag material to produce highly cementitious material therefrom and in adding Portland cement thereto.

4. The cement process which consists in incorporating alkaline salts with highly heated slag material, in treating said slag material to produce highly cementitious material therefrom and in adding Portland cement thereto.

5. The cement process which consists in incorporating alkaline salts in molten furnace slag, in incorporating alkaline solutions with said slag, and in granulating and cooling said slag to produce cementitious material.

6. The cement process which consists in disintegrating molten furnace slag and substantially simultaneously incorporating therewith a few per cent. of alkaline salts to produce highly cementitious material and in incorporating a relatively small proportion of hydraulic independently cementitious material therewith.

7. The cement process which consists in disintegrating substantially molten furnace slag and substantially simultaneously incorporating therewith solutions of alkaline salts to produce cementitious material and in incorporating a relatively small proportion of hydraulic independently cementitious material therewith.

8. The cement process which consists in disintegrating molten furnace slag and substantially simultaneously incorporating therewith a few per cent. of alkaline salts comprising sulfate material to produce highly cementitious material and in incorporating a relatively small proportion of hydraulic independently cementitious material therewith.

9. The cement process which consists in incorporating substantially dry alkaline material with molten furnace slag, in disintegrating said slag by an air blast carrying alkaline material to produce highly cementitious material.

10. The cement process which consists in injecting substantially dry alkaline material into a body of molten slag material and in treating said slag material to form highly cementitious material therefrom.

11. The cement process which consists in injecting sodium salts into a body of molten slag material and in treating said material to form highly cementitious material therefrom.

12. The cement comprising highly cementitious material having substantially the same chemical composition as furnace slag formed by the incorporation of sodium salts with molten furnace slag and also comprising independently cementitious material.

13. The cement comprising independently cementitious material and highly cementitious material formed from furnace slag by the incorporation of alkaline material therewith, said cement having substantially the same chemical composition as furnace slag.

14. The cement formed from furnace slag with which alkaline material has been incorporated comprising active slag cement material, inert slag cement material and independently cementitious material.

15. The cement comprising highly cementitious material having substantially the same chemical composition as furnace slag formed by the disintegration and substantially simultaneous incorporation of a few per cent. of alkaline salts with said slag and comprising incorporated independently cementitious material.

16. The cement comprising highly cementitious slag material formed by disintegration and substantially simultaneous incorporation of a few per cent. of alkaline salts with furnace slag and comprising a relatively small proportion of incorporated hydraulic cement.

17. The cement formed from furnace slag with which alkaline material has been incorporated comprising active slag cement material, and inert slag cement material.

18. The cement process which consists in incorporating alkaline salts in molten furnace slag, in incorporating alkaline solutions with said slag, in granulating and cooling said slag to produce cementitious material and in adding independently cementitious material.

19. The cement process which consists in incorporating alkaline salts with molten furnace slag, in disintegrating and cooling said slag to produce cementitious material therefrom and in adding independently cementitious material.

20. The cement process which consists in incorporating sodium salts with highly heated slag material, in treating said slag material to produce highly cementitious material therefrom and in adding independently cementitious material.

21. The cement process which consists in incorporating alkaline salts with highly heated slag material, in treating said slag material to produce highly cementitious material therefrom and in adding independently cementitious material.

22. The cement process which consists in disintegrating molten furnace slag and substantially simultaneously incorporating therewith a small percentage of alkaline salts and treating the same to produce cementitious material and incorporating therewith a relatively small proportion of hydraulic independently cementitious material.

23. The cement process which consists in disintegrating substantially molten furnace slag and substantially simultaneously incorporating alkaline material therewith by bringing alkaline solutions into contact therewith and treating the same to produce cementitious material and incorporating hydraulic independently cementitious material therewith.

24. The cement process which consists in disintegrating substantially molten furnace slag and substantially simultaneously incorporating therewith solutions of alkaline salts comprising sulfate material to produce cementitious material and in incorporating a relatively small proportion of hydraulic independently cementitious material therewith.

25. The cement process which consists in disintegrating molten furnace slag and substantially simultaneously incorporating therewith a few per cent. of alkaline salts comprising sulfate material to produce highly cementitious material and in incorporating a relatively small proportion of Portland cement therewith.

26. The cement process which consists in disintegrating substantially molten furnace slag and substantially simultaneously incorporating therewith solutions of alkaline salts comprising sulfate material to produce cementitious material and in incorporating a relatively small proportion of Portland cement therewith.

BRUNO BRUHN.

Witnesses:
OTTO W. HELLMRICH,
IDA CHRIST. HAFERMANN.